UNITED STATES PATENT OFFICE.

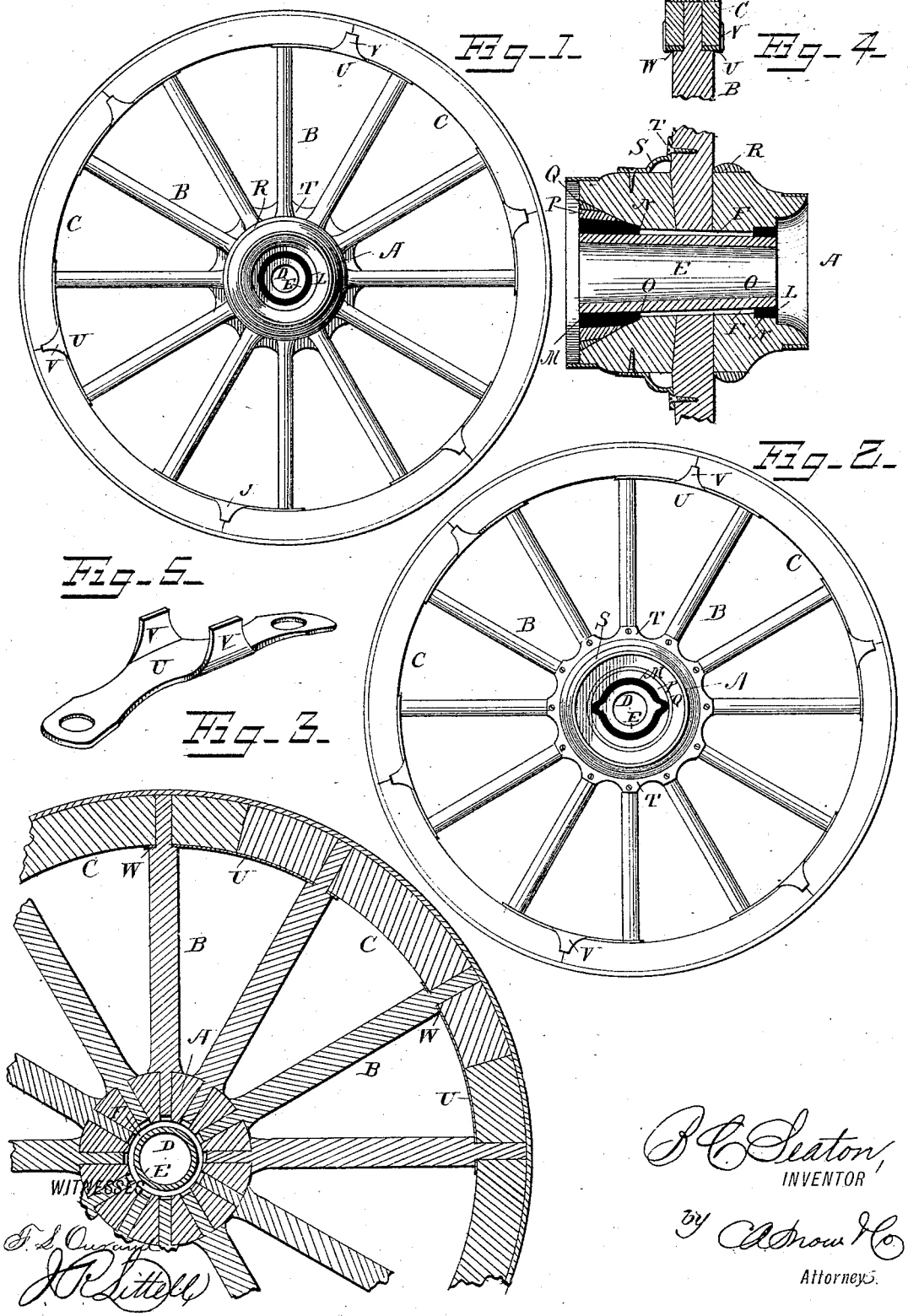

BENJAMIN C. SEATON, OF COWAN, TENNESSEE.

VEHICLE-WHEEL.

SPECIFICATION forming part of Letters Patent No. 285,515, dated September 25, 1883.

Application filed July 11, 1883. (No model.)

*To all whom it may concern:*

Be it known that I, BENJAMIN C. SEATON, a citizen of the United States, residing at Cowan, in the county of Franklin and State of Tennessee, have invented a new and useful Vehicle-Wheel, of which the following is a specification, reference being had to the accompanying drawings.

This invention relates to wagon and carriage wheels, and its object is to provide a wheel possessing superior advantages in point of simplicity, inexpensiveness, durability, and general efficiency, and that will obviate any strain or jar on the spindle and hub.

In the drawings, Figure 1 is a front elevation of a wheel embodying my improvements. Fig. 2 is a rear elevation of the same. Fig. 3 is a vertical longitudinal sectional view. Fig. 4 is a vertical transverse sectional view. Fig. 5 is a detail perspective view, showing one of the rim-plates.

Referring to the drawings, A designates the hub of the wheel, in which the spokes B are tenoned in the usual manner, and carry the rim C. The hub is formed with the usual central bore, D, in which the box E is placed, the diameter of the said box being somewhat less than the diameter of the said bore, so that there will be a space, F, between the box and the hub. This space F is filled at each end of the hub by a cylindrical elastic packing, L M, preferably formed of rubber, the ends of the bore D being preferably recessed, as shown at N, to receive a part of the packing, and to form interior shoulders, O, that serve to obviate inward longitudinal displacement of the packing. The recess N at the inner end of the hub is preferably enlarged at its outer end, to provide for a corresponding wedge-piece, P, that is driven between the packing or cushion and the hub, as shown. A metallic ring, Q, may be driven between the wedge and the hub to more securely retain the wedge and packing in position. By this arrangement it will be seen that the weight of the load will come upon this elastic cushion or packing between the box and hub, and that the space between these latter parts will admit of the compression and expansion of the cushions, which will also serve to take up or break any sudden jars in passing over rough roads, &c., and thereby prevent damage to the wheel. The cushions also prevent any oil from getting between the hub and box, which is a great advantage, in that the tenon of the spokes is always dry and not subject to the damage that would likely ensue if they were wet with oil. The box does not touch the hub and the spokes do not touch the box. On the outside of the hub A is secured a band, R, that comes against the front faces of the spokes at the point where they enter the hub. A corresponding band, S, is arranged around the hub at the other side of the spokes, and is provided with a raised flange extending annularly at its inner edge, as shown at T, and secured to the spokes to brace them securely in position and obviate all liability to break at their tenon ends. A plate, U, is arranged to connect each succeeding pair of spokes, and is provided with flanges V V at its sides, that clamp the rim of the wheel and obviate lateral displacement of the plate. These plates also come under the shoulder W at the end of the spoke that is tenoned in the rim, and prevent the spoke from sinking into or depressing the rim.

I claim as my invention—

As an improvement in vehicle-wheels, the combination of the hub A, having the bore D, enlarged at one end, N, the box E, arranged in said bore and having a lesser diameter than the latter for its entire length, so that a space is left between the surface of the box and the interior of the bore, the cylindrical elastic cushions or packings, arranged at the ends of the bore and projecting some distance from the hub into the bore D and against the ends of the box, to the surface of which latter it conforms, the wedge-piece P, corresponding to the shape of the end N, and driven between the box and the cushion to compress the latter against the end of the box, and the lock-ring Q, driven between the wedge and hub, all arranged and operating substantially as and for the purpose set forth.

In testimony that I claim the foregoing as my own I have hereto affixed my signature in presence of two witnesses.

BENJAMIN COPLIN SEATON.

Witnesses:
EDWARD BIRCHENOUGH,
CHARLES A. COLEMAN.